K. VÖLLER.
LIQUID RECOIL BRAKE FOR GUNS.
APPLICATION FILED JAN. 11, 1908.
1,028,081.
Patented May 28, 1912.
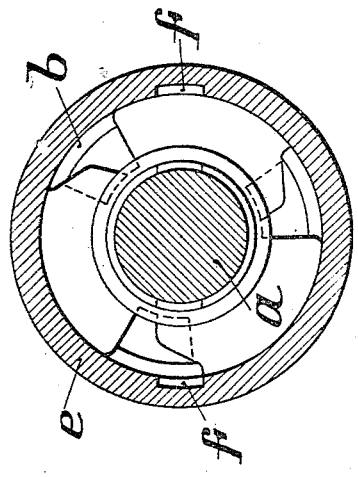
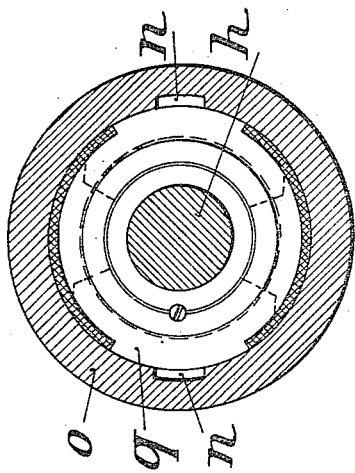
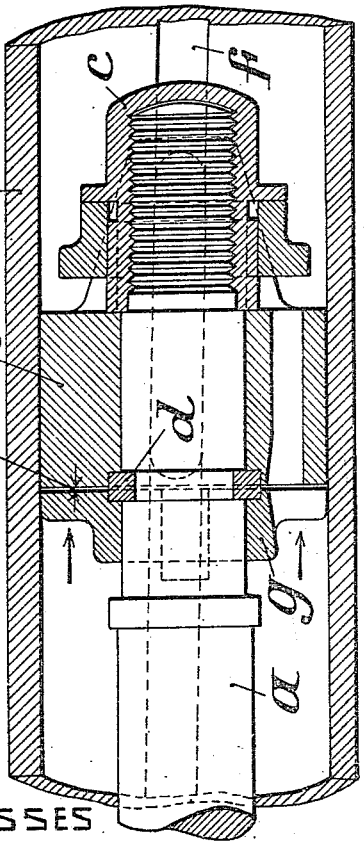
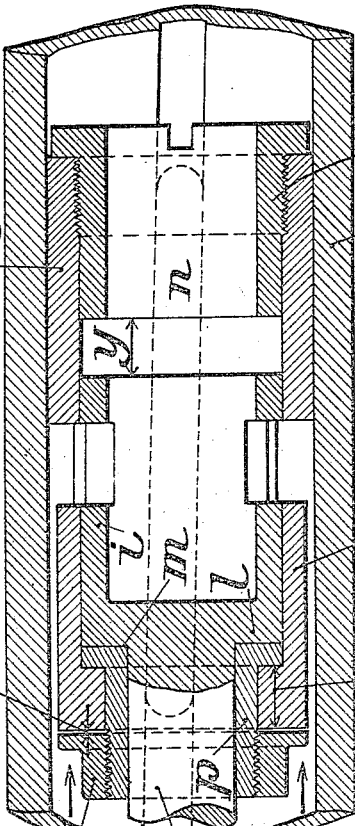

UNITED STATES PATENT OFFICE.

KARL VÖLLER, OF DUSSELDORF, GERMANY, ASSIGNOR TO RHEINISCHE METALL-WAAREN- UND MASCHINENFABRIK, OF DUSSELDORF-DERENDORF, GERMANY.

LIQUID RECOIL-BRAKE FOR GUNS.

1,028,081. Specification of Letters Patent. Patented May 28, 1912.

Application filed January 11, 1908. Serial No. 410,415.

*To all whom it may concern:*

Be it known that I, KARL VÖLLER, engineer, a subject of the German Emperor, residing at 17 Jülicherstrasse, Dusseldorf, Germany, have invented certain new and useful Improvements in Liquid Recoil-Brakes for Guns; and I do hereby declare the following to be a full, clear, and exact description of the invention, such as will enable others skilled in the art to which it appertains to make and use the same.

The present invention relates to recoil brakes for guns wherein the cross sectional area of the passage for the fluid is controlled during the recoil by two valve parts situated opposite each other and rotating relatively to each other, in opposite directions so as gradually to close the passage. To effect this one part of the valve is fixed to the piston rod so that it can not rotate while the other has guide fillets or lugs engaging in helical grooves in the brake cylinder, so that it is rotated during the recoil. Since the pressure exerted by the brake liquid during recoil is very high the parts of the valve are in the valves as heretofore constructed firmly pressed together so that on the one hand the non-rotating part retards the rotation of the other part, and there is great friction between the parts entailing a corresponding effect on the guiding fillets and grooves and affecting the accuracy of their fit, while on the other hand the rotary part tends to rotate the non-rotating part and so exerts a torsion on the piston rod; moreover, there is much wear owing to the friction between the parts. The present invention purposes to remove these objections by causing the liquid pressure in the axial direction to be borne by the non-rotating part and thereby transmitted to the piston rod, and by leaving between the relatively moving surfaces of the valve parts a space, which is kept so small that the liquid is very strongly throttled and therefore the pressure of the liquid is not transmitted between these surfaces.

In the accompanying drawings Figures 1 and 2 show the application of the invention to a brake wherein the rotating part of the valve is behind the non-rotating part in the direction of the pressure. Figs. 3 and 4 show a brake wherein the rotating part is in front of the non-rotating part. Figs. 1 and 3 being longitudinal sections and Figs. 2 and 4 cross sections.

In Figs. 1 and 2, $a$ is the piston rod connected in the usual manner with the cradle; on this rod is mounted the piston $b$ which is free to rotate, but is held against axial movement by the nut, $c$, on the end of the piston rod, $a$, bearing against the front side of the piston and a divided ring, $d$, fitted in an annular groove in the piston rod and engaging the rear side of the piston. On the recoil of the brake cylinder $e$ which is fixed to the gun barrel, the piston $b$ is rotated owing to the engagement of fillets or lugs on the outer side thereof in the helical grooves $f$ of the brake cylinder. The valve plate $g$ which controls the passage of the brake liquid during the recoil, is mounted on the piston rod $a$ so as to be axially movable but incapable of rotation. The whole pressure of the fluid acts on this plate in the direction of the arrow in Fig. 1, during the recoil. The valve plate $g$ is constructed with a circular groove in its front face which receives the ring $d$. The width of this ring, $d$, exceeds the combined depth of its seats in the piston and the valve plate so that a small space, $x$, will be left between the adjacent faces of the said plate and the piston so that there can be no frictional contact between these surfaces and transmission of the fluid pressure between the same is impossible. In this manner the greater part of the axial pressure is transmitted from valve $g$ to piston rod $a$ and the piston $b$ is practically completely relieved of pressure.

In Figs. 3 and 4 an example is shown wherein unlike the previous case, the fluid pressure does not act on the non-rotating part but on the rotary part placed in front of the latter. This requires a separate relieving disk which during the recoil lies in front of the rotary part of the valve, leaving a small space. In these figures $h$ is the piston rod fixed to the cradle and provided with the enlarged head $i$. On this enlarged head is a sleeve $k$, free to slide and to rotate. The axial movement of the sleeve $k$ is limited in one direction by the shoulder $l$ on the piston rod $h$ and in the other direction by a stop or plug, $s$, screwed into the front end of the sleeve $k$, so that the latter can move axially through the distance $y$ indicated between the inner end of the stop and the front end of the head $i$ of the piston rod. The rotatory motion is derived from the engagement of fillets on the piston or sleeve in the grooves $n$ of the brake cylinder $o$. In order as much as possible to keep the pressure acting in the direction of the arrow (Fig. 3) during the recoil from the rotating sleeve $k$ a bush $p$ is inserted in the latter upon which is screwed the ring $q$. The distance between the flange of the bush $p$ and the ring $q$ is somewhat greater than the depth $r$ of the shoulder in the sleeve $k$ so that there is a small space $x$ which prevents the transmission of the pressure between the surfaces. The pressure acting on the free surface of ring $q$ and bush $p$ during recoil is transmitted by the bush $p$ to the front face $m$ of the head $i$, while the sleeve $k$ is relieved of pressure. This latter is only affected by the pressure exerted within the small cylindrical segments between the ring $q$ and the brake cylinder $o$, shown cross-hatched in Fig. 4.

The invention can also be applied to other brake piston constructions in which the conditions are equivalent to those described.

Having now particularly described and ascertained the nature of my said invention and in what manner the same is to be performed, I declare that what I claim is:—

1. A liquid recoil brake for guns comprising a valve for controlling the flow of the brake liquid consisting of a rotatable and a non-rotatable part arranged to coact and means to hold said parts constantly out of contact.

2. In a liquid recoil brake for guns, the combination of a valve member mounted to slide but incapable of rotation, a valve member mounted to rotate but incapable of axial movement, and a spacing ring arranged to prevent contact between the said members.

3. The combination of the piston rod, a rotatable piston mounted on the piston rod, a slidable valve plate mounted on the piston rod adjacent the end of the piston, and a spacing ring seated in the piston rod and engaging the opposed faces of the piston and the valve plate to hold them out of contact.

In testimony whereof I have hereunto affixed my signature in the presence of two witnesses.

KARL VÖLLER.

Witnesses:
WILHELM FLASCHE,
PETER LIEBER.